(12) United States Patent  (10) Patent No.: US 8,261,457 B1
Peters  (45) Date of Patent: Sep. 11, 2012

(54) LASER JAW SETTING SYSTEM FOR CNC LATHES

(76) Inventor: Bradley Dean Peters, Eugene, OR (US)

( * ) Notice: Subject to any disclaimer, the term of this patent is extended or adjusted under 35 U.S.C. 154(b) by 0 days.

(21) Appl. No.: 13/066,935

(22) Filed: Apr. 27, 2011

Related U.S. Application Data

(63) Continuation-in-part of application No. 12/804,453, filed on Jul. 21, 2010, now abandoned.

(60) Provisional application No. 61/227,389, filed on Jul. 21, 2009.

(51) Int. Cl.
 *G01B 11/27* (2006.01)
(52) U.S. Cl. .................. 33/286; 33/DIG. 21; 33/642
(58) Field of Classification Search .................. 33/286, 33/626, 628, 636, 638, 639, 642
 See application file for complete search history.

(56) References Cited

U.S. PATENT DOCUMENTS

| | | | |
|---|---|---|---|
| 4,976,019 A * | 12/1990 | Kitamura | 33/DIG. 21 |
| 5,358,364 A * | 10/1994 | Kall | 33/642 |
| 6,931,971 B2 | 8/2005 | Lucchetti | |
| 2007/0068020 A1 * | 3/2007 | Adrian | 33/286 |
| 2008/0110036 A1 * | 5/2008 | Chen | 33/286 |
| 2009/0260239 A1 * | 10/2009 | Cerwin | 33/286 |
| 2010/0186248 A1 * | 7/2010 | Seger et al. | 33/638 |
| 2010/0205815 A1 * | 8/2010 | Rinn | 33/502 |
| 2012/0079730 A1 * | 4/2012 | Clemens et al. | 33/286 |

* cited by examiner

*Primary Examiner* — G. Bradley Bennett
(74) *Attorney, Agent, or Firm* — Robert E. Howard

(57) ABSTRACT

A CNC lathe jaw alignment system in which the position of the work holding edge of a chuck jaw is accurately located with respect to a work holding tool block mounted on a CNC lathe turret. A laser alignment tool is provided which includes a housing containing a light emitting laser module powered by a battery and an on/off switch. This laser module is used to project a laser beam onto the mounting face of a CNC lathe chuck to form a red target dot at the diameter of the workpiece. The laser alignment tool allows the lathe operator to visually see the workpiece diameter on the chuck as a red target dot generated by the laser module. This red target dot allows the operator to substantially expedite the process of accurately attaching jaws to a CNC lathe chuck in preparation for machining processes.

12 Claims, 3 Drawing Sheets

LASER JAW SETTING SYSTEM FOR CNC LATHES

CROSS-REFERENCE TO RELATED APPLICATIONS

This application is a continuation-in-part of U.S. patent application Ser. No. 12/804,453 filed Jul. 21, 2010 now abandoned, which said application claims the benefit of U.S. Provisional Patent Application No. 61/227,389 filed Jul. 21, 2009.

BACKGROUND OF THE INVENTION

The present invention relates to a laser jaw setting system for CNC (computer numeric controlled) lathes.

One problem with lathes in general, including CNC lathes, is the difficulty in accurate placement of the workpiece holding jaws. Such placement still remains an art, dependent upon the skill of the lathe operator.

Even when the jaws are properly placed it is not always possible to leave the same set of work holding jaws on a lathe until the job is finished.

Setting the lathe chuck jaws in the proper work holding position is often done by using a pair of machinist calipers set at the diameter of the workpiece needed to be held by the jaws. These calipers are commonly held against the lathe chuck to give a visual reference of the specific workpiece diameter or inner bore needed to be held by the jaws. Alternatively, and if available, a piece of raw stock having the exact diameter of the workpiece is held against the chuck with one hand while bringing a chuck jaw down to the piece of stock and tightening it in the approximate location. This step is repeated for the additional jaws, typically a total of three. The process of holding the raw stock or calipers by hand concentric with the chuck to reference the jaw positions is very difficult, if not impossible, for the operator. The jaws must also be positioned in the unclamp position larger than the material to be held in order for the jaws to hold onto the material within the chucks clamping range. Holding the material in the center of the clamping range is important as to maximize the holding power of the chuck. There are other ways to set the jaws up that are specific to each operator but usually require two or three adjustments of all jaws in order to finalize their positions. This is time consuming and frustrating for the machine tool operator.

There have been many suggestions for devices to assist with the attachment of the work hold jaws thereto. Such devices have heretofor been too bulky, or require too many steps and excessive skill to use properly.

U.S. Pat. No. 6,931,971 describes a laser based jaw setting device for a CNC lathe. While this device is an improvement over many other suggested devices, it is only attached to the lathe for a short time and is then transported to another lathe for use thereon. Since the laser device is mounted to the front of the tool holding turret with a magnet and rod supplied by the operator, the tool position varies each time the operator positions the magnet on the front of the turret. The laser device is not part of the machine and it must be removed each time the machine tool is used since it would not stay secured to the turret and would interfere with machining processes if left on the machine. Each time the laser device is attached to a turret the laser beam must be calibrated to a known diameter as a reference point, which is time consuming and requires operator intervention.

SUMMARY OF THE INVENTION

The present invention is a system for aligning the workpiece holding jaws on the chuck of a CNC lathe having one or more tool blocks, a workpiece holding chuck, and a plurality of workpiece holding jaws (typically three) adjustably mountable on the chuck A laser module capable of generating a narrow laser beam is mounted within a housing together with a power supply for the laser, the power supply electrically communicating with the laser through an on/off switch, to form a laser alignment tool.

The laser alignment tool is permanently mounted on or within the tool block of a CNC lathe with the laser beam generating end thereof facing the chuck and with the beam generated by said laser alignment tool being located on the centerline of the tool holding tool block and parallel to the centerline of the CNC lathe.

The laser alignment tool is assigned a tool location in the computer of the CNC lathe in a manner well known in the art. This allows the laser alignment tool to be moved to any desired position from its assigned location by entering appropriate instructions into the CNC lathe computer.

The outside or inside diameter of a workpiece to be held by the jaws of the chuck is determined, and the computer of the CNC lathe is instructed to position the laser alignment tool so that its beam will strike the chuck at a target location where the workpiece holding edge of the jaws are to be located. The laser alignment tool is then activated to generate a laser beam which strikes the chuck at the target location forming a red dot target thereon.

A first jaw is positioned on the chuck so that its workpiece holding edge is in alignment with the red dot target projected by the laser beam.

The chuck is then rotated to the location of each of the remaining jaws and the alignment procedure repeated.

DESCRIPTION OF PREFERRED EMBODIMENTS

Figure 1:
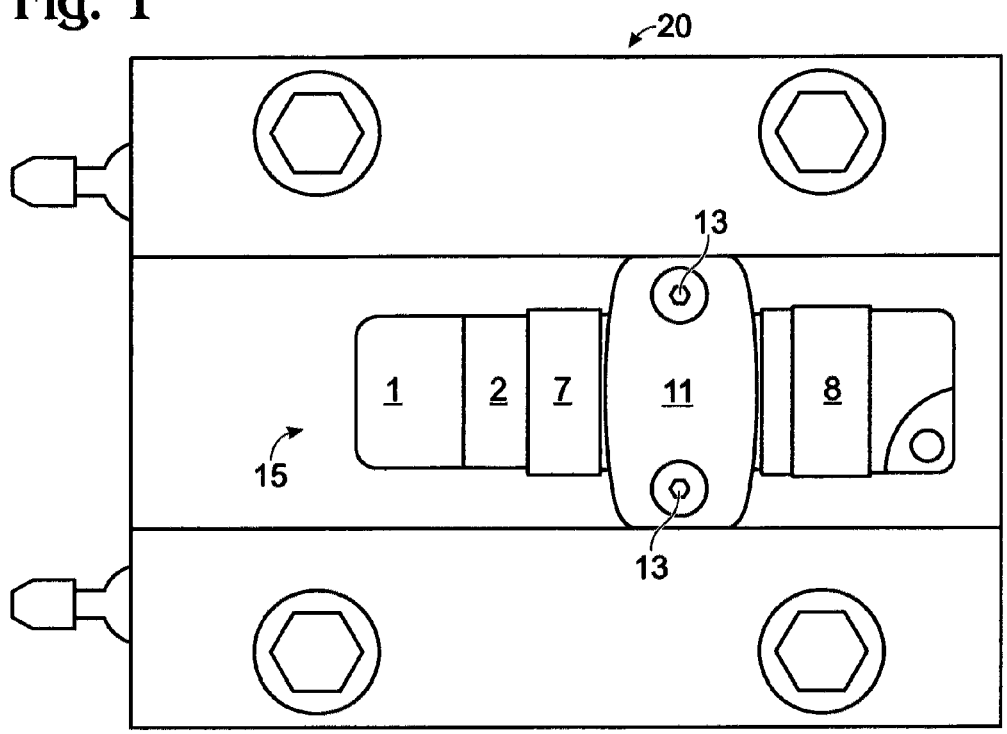
FIG. 1 is a side elevation view of the laser alignment tool of the present invention shown mounted on a CNC tool block.
Figure 2:
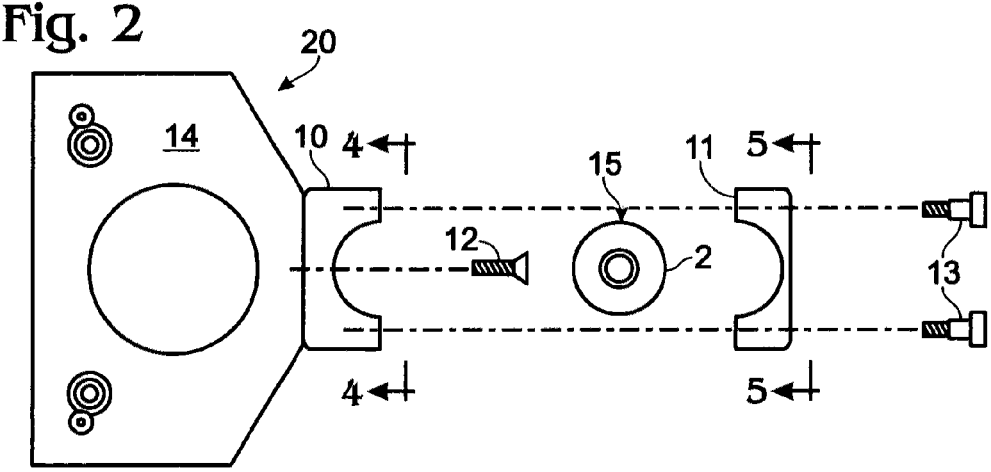
FIG. 2 is an exploded front view of the laser alignment tool and associated bottom and top cradle members attached to a CNC tool block.
Figure 3:
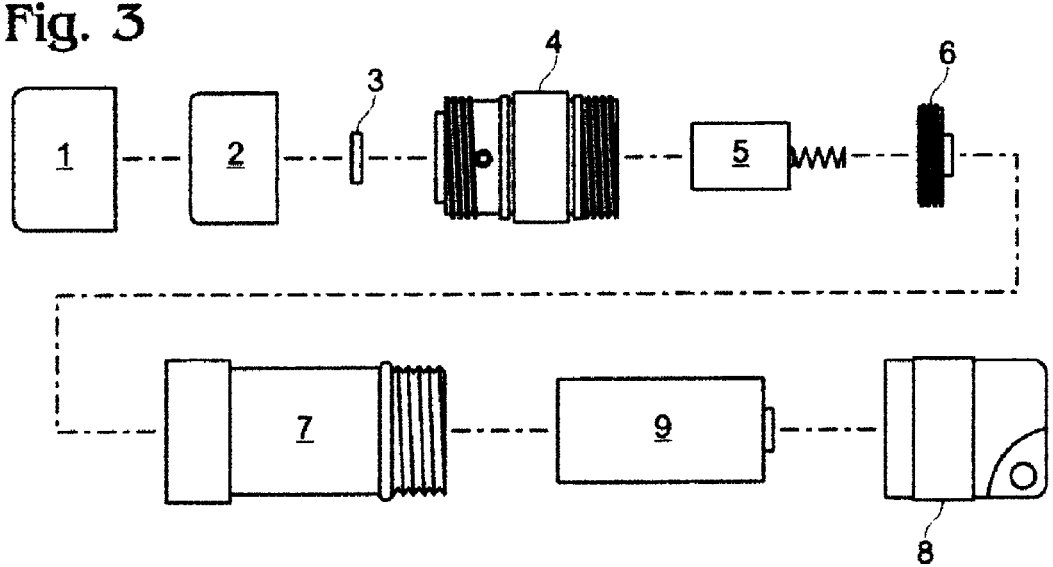
FIG. 3 is an exploded view of the various components of the laser alignment tool.
Figure 4:
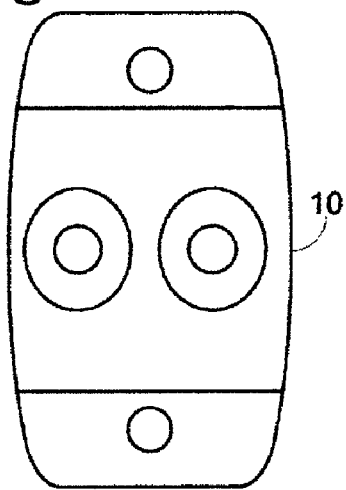
FIG. 4 is top view of the bottom cradle clamp taken along line 4-4 of FIG. 2.
Figure 5:
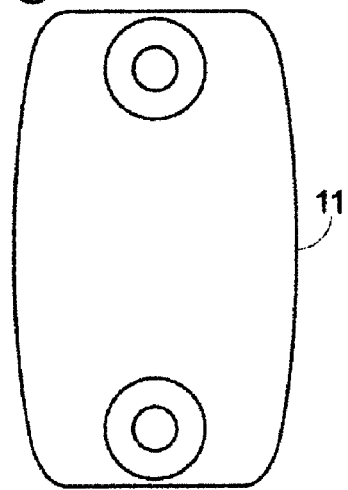
FIG. 5 is a top view of the top cradle clamp taken along line 5-5 of FIG. 2.

The present invention relates to a laser jaw setting system for a CNC turning center (lathe) in which a laser alignment tool 15 is permanently mounted on a tool holding tool block 20 held by the turret of the CNC lathe. By "permanently" mounted is meant it is not intended to be removed except for replacement or repair. The laser alignment tool 15 projects a red laser target dot 18 onto the CNC lathe chuck 30 at the location of the inside or outside diameter of the workpiece to be held by the chuck, thereby expediting the accurate positioning and attachment of the work holding jaws 32, 34, and 36 to the chuck 30.

The laser jaw setting system for a CNC lathe center is comprised of the following components:

Reference No.—Name of Part
1—Rubber cover cap
2—Front end cap
3—Protective glass cover
4—Laser module housing
5—Laser module
6—Housing cap
7—Battery housing
8—Back end cap
9—Lithium ion battery
10—Bottom cradle clamp
11—Top cradle clamp
12—6/32 counter sink screws
13—6/32 shoulder screws
15—Complete laser alignment tool
16—Laser beam
18—Red target dot generated on the chuck by the laser beam
20—CNC tool block
30—CNC chuck
32—CNC first jaw
33—CNC first jaw workpiece holding edge
34—CNC second jaw
35—CNC second jaw workpiece holding edge
36—CNC third jaw
37—CNC third jaw workpiece holding edge The rubber protective end cap 1 of laser alignment tool 15 is configured and designed to protect the internal workings from water, impact and metal chips from cutting processes. End cap 1 could be configured in different shapes and sizes. It may be comprised of any formable or machineable material.

An aluminum metal front end cap 2 is designed to seal against the protective glass cover 3 to provide a seal which protects the internal laser module 5 against environmental hazards. The front end cap 2 is designed round to ease the manufacturing process, but could be made into any desired shape. The cap could be made from any machineable metal.

The protective glass cover 3 is designed to seal against the laser module housing 4 to provide protection to the internal components from environmental hazard. The glass 3 is cut in a square shape but could be configured n any shape that would allow it to seal against the housing 4. This piece could comprise of any transparent material that would allow light to pass through parallel.

The laser module housing 4 is a component designed to contain and hold the laser module 5, The component is round in nature for ease of manufacturing but is not limited to this shape. This part may be comprised of any machnineable and supportable material.

The laser module 5 is a conventional device designed to emit a red light source from a laser diode and contains the required electronics, lens and spring connector. The module 5 may be produced in any shape that would allow it to be sealed inside the housing 4. The material used may be any electrically conductive material.

The housing cap 6 is a component designed to seal the back of the laser module housing 4 and provide an electrical connection between the battery 9 and the laser module 5. The part could be configured in a shape that would allow it to thread or seal against the back of the housing 4. The material used may comprise of any electrically conductive material.

The battery housing 7 is a component designed to thread against the laser module housing 4 and provide water tight housing for the battery 9. It has internal threads on one end for receiving the back end cap 8 and external threads for receiving the back end cap 8. The battery housing 7 can be made of aluminum or any electrically conductive material.

The back end cap 8 is a device designed to seal the battery compartment against environmental effects and serves as an electrical connect for turning on and off the laser module 5. The end cap 8 contains an aluminum washer which holds a spring connecter used for contacting the positive end of the battery 9. The end cap 8 is shaped so as to thread onto the battery housing 7, and can be made of aluminum or any electrically conductive material.

The lithium battery 9 is a power source used to power the laser module 5. Preferably battery 9 is a 3 volt lithium battery, but it could be less than 3 volts and as long as it has a shape that would fit into the battery housing 7.

The bottom cradle clamp 10 is a component designed to bolt to a CNC tool block 20 and provides a radius section for the battery housing 7 to locate in. It provides threaded holes for the top cradle clamp 11 to fasten to. The shape must be designed in a way that secures the battery housing 7 and will hold screws for bolting to the tool block 20. The clamp 10 can be made of aluminum or any metal or plastic that is rigid.

The top cradle clamp 11 is a component designed to bolt to the bottom cradle clamp 10 with a radius section which locates the top portion of the battery housing 7. This component is used to keep the entire laser tool 15 from shifting or moving during operation. The shape of clamp 11 is designed to match the bottom clamp 10 and can be made of aluminum or any metal or plastic that is rigid The 6/32 counter sink screws 12 (only one being shown) are used to locate and secure the bottom cradle clamp 10 to the CNC tool block 20. Screws 12 can be made of alloy steel or a stainless steel.

The 6/32 shoulder screws 13 are designed to accurately locate and clamp the top cradle clamp 11 to the bottom cradle clamp 10 and provide a clamping force onto the battery housing 7. Screws 13 can be made of alloy steel or a stainless steel.

The back end cap 8 is connected to the battery housing 7 via threads. A CR123 3 volt lithium ion battery 9 is placed into the battery housing 7 opposite of the back end cap 8. The laser module 5 is placed inside the module housing 4. The housing cap 6 is threaded into the backside of the laser module housing 4 opposite of the exiting laser beam. The laser module housing 4 is connected via threads into the internal threads of the battery housing 7. The protective glass 3 rests against the retaining counter-bore in the exiting beam side of the laser module housing 4. The front end cap 2 is connected to the outer diameter threads of the laser module housing 4 which also presses against the protective glass 3 securing it against the counter bore. The rubber protective cover cap 1 is pressed by hand over the front end cap 2. The bottom cradle clamp 10 is connected to the CNC tool block 20 via two 6-32 counter sink screws 12. The entire jaw alignment laser tool 15 is placed into the radius portion of the bottom cradle clamp 10. The top cradle clamp 11 connects to the bottom cradle clamp 10 with two 6-32 shoulder screws 13 which applies clamping pressure to the battery housing 7 securing the entire jaw alignment laser tool 15.

Figure 6:
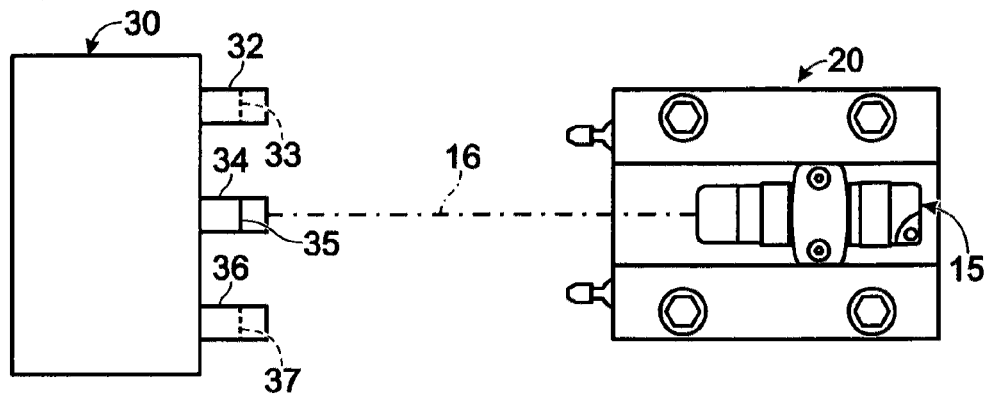
FIG. 6 is a side view of a CNC turning center chuck showing the laser alignment tool mounted on the CNC tool block and facing the chuck.
Figure 7:
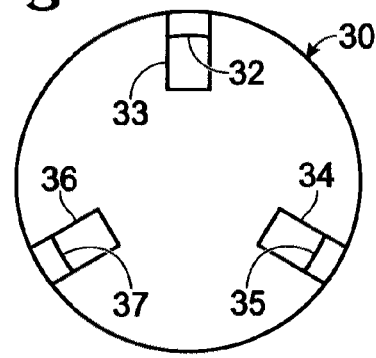
FIG. 7 is a front view of the chuck and jaws of a CNC turning center.

The laser alignment tool 15 is mounted on tool block 20 as shown in FIGS. 1 and 6 where it can direct its beam 16 toward and generate a red target dot 18 on workpiece chuck 30.

Alternatively, laser alignment tool 15 could be mounted within a passageway in the tool block to allow the laser beam 16 to be directed toward and onto the workpiece chuck 30.

The laser alignment tool 15 works by initially setting it up in the computer numerical control as though it were a tool, which tool setup is a well known procedure for all CNC turning centers. Thus the machine tool operator can use the CNC control to call up the jaw alignment laser 15 into its working position as though it were a tool.

Figure 8:
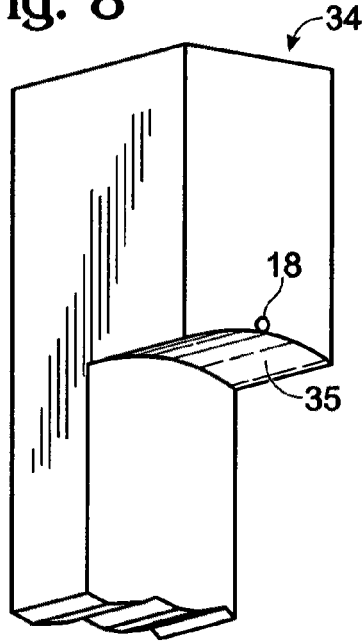
FIG. 8 is an enlarged view of the workpiece holding edge portion of a jaw showing the laser beam target thereon.

The operator would then instruct the CNC machine tool to position the red target dot 18 generated by laser beam 16 to a specific workpiece diameter on the chuck 30, the distance from the center of the chuck 30 to laser dot 18 representing the radius of a workpiece (not shown). This allows the operator to visually see the workpiece diameter on the chuck 30 that will be used to position the holding edges 33, 35, and 37 of jaws 32, 34, and 36. The red target dot 18 generated by laser beam 16 is used as a visual reference point to move the holding edge of a jaw, such as, for example, holding edge 35 of jaw 34, into the correct position to clamp onto a specific diameter part or raw stock and within the hydraulic chucks clamping range. This is shown in FIGS. 6 and 8 where the red target dot 18 generated by laser beam 16 is positioned at the desired location on chuck 30 and jaw 34 adjusted so that the workpiece holding edge 35 is aligned with red target dot 18.

The chuck 30 is then rotated by hand to the next jaw location and the process is repeated until all jaws 32, 34, and 36 are located in their correct positions. This creates a condition where all jaws 32, 34, and 36 are located concentrically on the chuck 30 which in turn holds the workpiece concentrically on the chuck 30 as well. This allows a balanced, accurate and safe condition to machine the part or raw material.

Components 1-13 are all necessary to allow the jaw alignment laser 15 to function and protect it from environmental hazards and secure it to the CNC tool block 20.

One of ordinary skill and knowledge of machining and electronics will recognize that alternative components of varying size and shape could be used to form a laser alignment tool that will perform the same functions as described for laser alignment tool 15. Those with common knowledge of laser modules and laser tools would understand that a wide variety of sizes and styles of laser module 5 would emit a narrow red laser beam 16 to provide a red target dot 18 on the chuck 30 that can used for positioning jaws 32, 34, and 36. Such laser modules are not specialized in nature and can be purchased from many sources.

The bottom and top cradle clamps 10, 11 are designed to be aesthetically pleasing, but could be of any shape and size configured to receive the laser components and accept hold down screws 12, 13 or alternative hold down fasteners to allow them to be held securely to the tool block 20.

The laser module 5, battery 9, and on off switch 8 could be incorporated within the CNC tool block 20, instead of fastened to the outside of the tool block as a separate component. The tool block 20 would then take the place of the aluminum housing 4 used to contain and protect the internal working components of the jaw alignment laser 15.

This tool can be used on a wide variety of makes, models and sizes of CNC turning centers, also known as CNC lathes, and is not limited to a particular model.

In use the machine tool operator would call up the tool location on tool block 20 where the laser alignment tool 15 is mounted using the tool offsets in the numerical control of the CNC lathe. The operator would program in the position to which the tool block 20 on which laser alignment tool 15 is mounted is to be moved in order for laser alignment tool 15 to project a laser beam 16 onto the chuck 30 at the desired location. The operator would then remove the protective rubber cap 1 and turn the on/off end cap 8 clockwise to turn on the laser module 5 and cause the laser beam 16 to project a red target dot 18 onto the chuck 30 at its programmed location. The operator would then mount a first jaw 32 on chuck 30 by aligning the laser target dot 18 with the work holding edge 33 of the jaw 32. The chuck 30 would then be rotated by hand to the second jaw 34 location and the positioning process repeated until all jaws 32, 34, and 36 are positioned at their correct positions. Once this process is finished the protective rubber end cap 1 is placed back on the front end cap 2. The on/off end cap 8 is rotated counter clockwise until the laser alignment tool 15 turns off.

The laser alignment tool 15 of the present projects a red laser target dot 18 onto the face of chuck 30 at a diameter specified by the operator, typically the diameter of the part to be worked on plus one half of the travel of the hydraulic chuck. This is done by using the CNC machine control and the accuracy built into the machine tool. This is a process that is well known to a machine tool operator. The red target dot 18 is used as a target by the operator to move the holding edges 33, 35, and 37 of each chuck jaw 32, 34, and 36, respectively, to the red target dot 18 and securing the jaw in that position. This allows the operator to use both hands, and allows him to visually see where on the chuck 30 the jaws 32, 34, and 36 must be positioned to hold the workpiece concentric with the chuck. This creates a balanced condition and a safer environment for the operator. The jaw alignment laser 15 substantially reduces the time it takes to secure the jaws 32, 34, and 36 to the chuck 30 in the correct position, benefiting both the operator and the owner of the machine tool.

It will be obvious to those having skill in the art that many changes may be made to the details of the above-described embodiments of this invention without departing from the underlying principles thereof. The scope of the present invention should, therefore, be determined only by the following claims.

The invention claimed is:

1. The process for aligning the workpiece holding jaws on the chuck of a CNC lathe comprising:
   providing a CNC lathe having one or more tool blocks, a workpiece holding chuck, and a plurality of workpiece holding jaws having workpiece holding edges that are adjustably mountable on said chuck
   providing a laser capable of generating a narrow beam from a laser beam generating end thereof;
   providing a housing for the laser;
   mounting the laser within the housing;
   mounting a power supply for the laser within said housing and electrically communicating said power supply with said laser through an on/off switch to form a laser alignment tool;
   permanently mounting said laser alignment tool on or within the tool block of a CNC lathe with the laser beam generating end thereof facing said chuck and with the beam generated by said laser alignment tool being located on the centerline of said tool block and parallel to the centerline of said CNC lathe;
   assigning said laser alignment tool a location in the computer of said CNC lathe;
   determining the diameter of a workpiece to be held by the jaws of said chuck;
   instructing the computer of said CNC lathe to position said laser alignment tool so that its beam will strike said chuck and form a red laser target dot on said chuck at a target location where the workpiece holding edges of said jaws are to be located;
   activating said laser alignment tool to generate a laser beam which strikes said chuck at said target location;

positioning a first jaw so that its workpiece holding edge is in alignment with said laser beam;

rotating said chuck to the location of the remaining jaws and repeating the alignment step.

2. The process of claim 1 where said laser is a laser module located within a laser module housing.

3. The process of claim 2 wherein said laser module housing has a protective glass cover attached to the front end thereof.

4. The process of claim 3 wherein a front end cap seals said protective glass cover.

5. The process of claim 4 wherein a rubber protective end cap is located over said front end cap.

6. The process of claim 2 wherein a housing cap seals the back of the laser module housing.

7. The process of claim 1 wherein said power supply is a battery.

8. The process of claim 7 wherein said battery is a 3 volt lithium battery.

9. The process of claim 7 wherein said battery is located within a battery housing.

10. The process of claim 1 wherein said laser alignment tool is attached to said tool block between a top and bottom cradle clamp.

11. The process of claim 10 wherein said bottom cradle clamp is attached to said tool block.

12. A CNC lathe having a laser alignment tool comprising:
a CNC lathe having one or more tool blocks, a workpiece holding chuck, and a plurality of workpiece holding jaws mounted on said chuck;
a laser alignment tool permanently mounted on or within said tool block;
said laser alignment tool having a laser module located within a laser module housing;
said laser module housing having a protective glass cover attached to the front end thereof and a front end cap sealing said protective glass cover;
a rubber protective end cap located over said front end cap;
a housing cap sealing the back of the laser module housing; and
a power supply for the laser module located within said housing and electrically communicating said power supply with said laser module through an on/off switch.

* * * * *